United States Patent [19]
Yoshimura

[11] 3,709,821
[45] Jan. 9, 1973

[54] ORGANIC SOLID ELECTROLYTE
[75] Inventor: Susumu Yoshimura, No. 1006, Oaza Kodama, Kadoma, Osaka, Japan
[22] Filed: Feb. 25, 1971
[21] Appl. No.: 119,059

[30] Foreign Application Priority Data

March 4, 1970 Japan ..................................45/18896

[52] U.S. Cl. .................252/62.2, 136/153, 317/230
[51] Int. Cl. ..............................................H01g 9/02
[58] Field of Search .......252/62.2; 317/230; 136/153

[56] References Cited

UNITED STATES PATENTS 3,483,438  12/1969  Sharbaugh.......................252/62.2 X

OTHER PUBLICATIONS

Melby et al. "J. Am. Chem. Soc.", Vol. 84, P. 3374-87, Sept. 1962

*Primary Examiner*—James E. Poer
*Assistant Examiner*—J. Cooper
*Attorney*—Robert E. Burns and Emmanuel J. Lobato

[57] ABSTRACT

An ionically conductive organic solid material which is useful for an electrolyte for electric devices. The material is a crystalline electron donor-acceptor complex comprising 7,7,8,8-tetracyanoquinodimethane and a monovalent cation and a small amount of high molecular weight interstitial inclusion impurities selected from the group consisting of cyanine and triphenylmethane dyes so that the material has an excellent ionic conductivity suitable for an electrolyte.

3 Claims, No Drawings

ORGANIC SOLID ELECTROLYTE

This invention relates to electrolytes and more particularly to ionic conductive organic solid electrolytes.

There are known various types of ionic conductive solid materials, one of which is inorganic halide such as alkali metal halide, silver halide and alkali earth metal halide. None of these materials are utilized for an electrolyte for a capacitor etc., since all these materials have at normal temperatures such low conductivities as to be virtually regarded as insulators. Another type of the known ionic conductive materials is a ternary glass material such as Ag—I—Hg which has recently been developed. This new material has resistivity as low as about 100Ωcm. Difficulty is, however, encountered in building up a high temperature and precisely controlling the ambient temperature when producing the ternary glass materials referred to above.

It is therefore an object of this invention to provide a novel ionic conductive solid electrolyte which is easily and economically manufactured.

Another object of this invention is to provide a novel ionic conductive solid electrolyte which has a sufficiently high ionic conductivity.

This invention employs the ionic conductivity of an electron donor-accepter (EDA) complex including 7,7,8,8-tetracyanoquinodimethane (TCNQ) as an acceptor.

As is well known, a TCNQ molecule is a large and plain molecule which has such a great electron affinity that, when mixed or melted with another molecule, the TCNQ molecule takes an electron from and is united with the other molecule so as to produce an electron donor-acceptor crystalline complex. The crystals of the electron donor-acceptor complex may be either ionic or neutral depending upon the magnitude of the ionization potential of the other or opposite molecule. When the opposite molecule has a relative small ionization potential, the TCNQ molecule traps the electron of the opposite molecule and ionically bonds with the opposite molecule.

Such EDA complexes as above-mentioned have thus far been regarded as electronically conductive materials. However, it is important that the EDA complexes have prominent ionic conductivities in addition to electronic conductivities.

Examples of the molecules having small ionization potentials are aromatic diamine, substituted ammonium ion, aromatic onium ion and metallic ion. The EDA complexes composed of the TCNQ and such molecules above-exemplified have ionic conductivities of several percent of their total conductivities. It is, however, desired that highly ionic conductive EDA complex be used for an electrolyte.

According to this invention, an ionic conductive EDA complex is provided, which has an increased ionic conductivity. This EDA complex is an organic ternary material comprising ionic crystals of the TCNQ as an acceptor, aromatic diamine, metallic ion, onium ion or the like as a donor, and from 0.1 to 10 percent by weight of a macro-molecule having a much greater molecular weight than those of the acceptor and donor molecules. Examples of such macro-molecule above-mentioned are unsaturated hydrocarbon having carbon numbers exceeding 20. Preferred unsaturated hydrocarbons are aromatic compounds and in particular cyanine or triphenylmethane dyes.

By adding the macro-molecules to the EDA complex of the TCNQ and the donor component, the lattice of the crystals of the EDA complex is strained so that the ionic conductivity of the EDA complex is increased.

Several method for introducing the macro-molecule into the EDA complex are available. One preferred method comprises forming ionic crystals of the TCNQ and the macro-molecules and thereafter mixing the ionic crystals with a host material of the EDA complex.

The ionic conductivity of the EDA complex according to the invention is ascertained by:

1. Contacting a needle of electrode metal of aluminum or tantalum on a subject material in a crystal or pellet form and applying a positive potential to the needle relative to the subject material while observing the current through the needle, wherein if the ionic conductive phenomena occurs within the subject material, the current through the needle rapidly decrease due to anodic oxidization of the needle by the ionic conduction; or 2. Pressing a metal element or foil of aluminum, magnesium or calcium onto the subject material while observing the electromotive force between the metal and the subject material, wherein if a stable electromotive force is built up, then it is known that ionic conduction is present.

The following representative examples illustrate in some degree the scope of the invention. It will be seen that EDA complexes prepared according to the invention exhibit ionic conductivities which are several 10 percent relative to the total conductivity. Such conductivities are greater than those achieved by the known art.

EXAMPLE I 1,1-diethyl-2,2'-cyanine($C_{23}H_{23}N_2$) was introduced into triethylammonium-TCNQ having a resistivity of 20Ωcm and void of ionic conductivity.

Cyanine iodide and lithium TCNQ were mixed with each other in the presence of ethanol with the result that ionic crystals of cyanine-TCNQ were obtained. 45gr. of trietylammonium and the ionic crystals of cyanine-TCNQ were dissolved in a sufficient amount of tetrahydrofuran. The resultant solution was boiled for about 2 hours and thereafter maintained at a normal temperature for about 30 hours to obtain crystals of triethylammonium-TCNQ including the cyanine and having a resistivity of 100Ωcm and an ionic conductivity of 25 percent.

EXAMPLE II

In the manner of example I ammonium-TCNQ ($NH_4^+TCNQ^-$) including 10 percent by weight of N-methyl-7,8-benzoquinolinium and having a resistivity of 300Ωcm and an ionic conductivtity of 30 percent was obtained.

EXAMPLE III

In the manner of example I black crystals of pyridinium-TCNQ ($C_5H_6N$ TCNQ) including 1 percent of salt with TCNQ of crystal violet ($C_{25}H_{32}N_3Cl \cdot 9\ H_2O$) and having a resistivity of 100Ωcm and an ionic conductivity of 20 percent was prepared. The initial pyridinium-TCNQ starting material had a resistivity of 20Ωcm and was devoid of any ionic conductivity.

It is apparent that the electrolyte according to this invention is advantageous in because it can be easily manufactured without use of a high temperature and precise control over the temperature. Furthermore, solidification of the electrolytes of an electric cell, electrolytic capacitor, electrolytic amplifier or the like is easily achieved by utilizing the electrolyte of this invention.

The macro-molecules which can be utilized in this invention are not limited to the macro-molecules used in the above examples but such may be any of macro-molecules capable of ionically bonding with the TCNQ, although cynanine and triphenylmethane dyes in particular are preferable.

What is claimed is:

1. An electrolyte consisting essentially of a crystalline electron donor-acceptor complex of 7,7,8,8-tetracyanoquinodimethane and a monovalent cation selected from the group consisting of aromatic diamines and onium ions, substituted ammonium ions and monovalent metals and further containing an unsaturated high molecular aromatic hydrocarbon selected from the group of cyanine dyes and triphenylmethane dyes in an amount of 0.1 to 10 percent by weight of said monovalent cation said hydrocarbon being present in an amount to improve the ionic conductivity of said crystalline complex.

2. The electrolyte according to claim 1 wherein said dye is crystal violet.

3. The electrolyte according to claim 1 wherein said dye is 1,1-diethyl-2,2'-cyanine.

* * * * *